United States Patent
Åsen et al.

(10) Patent No.: US 6,655,150 B1
(45) Date of Patent: Dec. 2, 2003

(54) METHOD FOR REMOVING AND RECOVERING $CO_2$ FROM EXHAUST GAS

(75) Inventors: Knut Ingvar Åsen, Porsgrunn (NO); Dag Arne Eimer, Porsgrunn (NO)

(73) Assignee: Norsk Hydro Asa, Oslo (NO)

( * ) Notice: Subject to any disclaimer, the term of this patent is extended or adjusted under 35 U.S.C. 154(b) by 0 days.

(21) Appl. No.: 09/913,852

(22) PCT Filed: Jan. 26, 2000

(86) PCT No.: PCT/NO00/00018

§ 371 (c)(1),
(2), (4) Date: Nov. 20, 2001

(87) PCT Pub. No.: WO00/48709

PCT Pub. Date: Aug. 24, 2000

(30) Foreign Application Priority Data

Dec. 19, 1999 (NO) .......................................... 19990812

(51) Int. Cl.[7] ................................................ F02C 7/00
(52) U.S. Cl. .............................................. 60/772; 50/39.5
(58) Field of Search ..................... 50/39.182, 39.5, 50/772, 781, 783, 784

(56) References Cited

U.S. PATENT DOCUMENTS

| | | | | |
|---|---|---|---|---|
| 5,233,837 A | * | 8/1993 | Callahan ..................... | 62/38 |
| 5,265,410 A | * | 11/1993 | Hisatome ..................... | 60/39.12 |
| 5,344,627 A | * | 9/1994 | Fujii et al. ..................... | 423/220 |
| 5,871,563 A | | 2/1999 | Roth et al. | |

FOREIGN PATENT DOCUMENTS

| | | |
|---|---|---|
| AU | A-28540/97 | 3/1998 |
| EP | 0551876 | 7/1993 |
| EP | 0 768 365 | 4/1997 |
| GB | 2 090 160 | 7/1982 |
| WO | 9521683 | 8/1995 |

OTHER PUBLICATIONS

Chiesa, P., et al. "$CO_2$ Emission Abatement in IGCC Power Plants by Semiclosed Cycles. Part B: with Air–Blown Combustion and $CO_2$ Physical Absorption", Amer. Soc. Mech. Engineers, 1998, pp. 1–8.

* cited by examiner

Primary Examiner—Louis J. Casaregola
(74) Attorney, Agent, or Firm—Wenderoth, Lind & Ponack, L.L.P.

(57) ABSTRACT

The present invention relates to a method for removing and recovering $CO_2$ from exhaust gas from a power and/or heat generating plant (a main power plant) by chemical absorption and desorption respectively, where the exhaust gas is fed to an absorber using a chemical absorbent where the $CO_2$ is absorbed in said absorbent and a $CO_2$-depleted exhaust gas stream is formed. The $CO_2$ rich absorbent is further fed to a desorber where $CO_2$ is removed from the absorbent, and the absorbent essentially free of $CO_2$ is recirculated to the absorber and desorbed $CO_2$ gas is discharged off. The exhaust gas is cooled and recompressed to an elevated pressure, in a compressor in a secondary power plant integrated with the main power plant, said absorber, and said desorber, before entering the absorber. The $CO_2$-depleted exhaust gas emerging from the absorber is reheated and further expanded in an expander in said secondary power plant.

19 Claims, 5 Drawing Sheets

Fig 1

Figure 1a (without intercooler)

Figure 2a (without intercooler)

METHOD FOR REMOVING AND RECOVERING CO$_2$ FROM EXHAUST GAS

This application is a 371 application of PCT/N00/00018 filed Jan. 26, 2000.

The present invention relates to a method for removing and recovering CO$_2$ from exhaust gas from a power and/or heat generating plant by chemical absorption and desorption for deposition as convenient at the location.

Due to the environmental aspects of CO$_2$ as a gas with greenhouse effect, and taxes on the emission of CO$_2$ by some national governments, the possibility of reducing the emissions of CO$_2$ to the atmosphere from a power and/or heat generating processes, in particular from exhaust gas from gas turbines offshore, in a way that implies reduced energy consumption and investment costs, has been widely discussed.

Conventional power and/or heat generating processes, using carbon containing fuels and where the oxygen source is air, have carbon dioxide concentrations of 3–15% in the combustion products, hereinafter called exhaust gas, dependent on the fuel and the combustion and heat recovery process applied. E.g. in natural gas fired gas turbines the concentration of CO$_2$ in the exhaust gas is only 3–4%. Thus, a reduction in the emission of carbon dioxide to the atmosphere makes it necessary to separate the carbon dioxide from the exhaust gas because it will be too expensive to compress and deposit the whole exhaust gas. The compression of the recovered CO$_2$ for deposition in e.g. a geological formation is an implied part of any recovery method.

The concentration of carbon dioxide in the exhaust gas may be raised to higher levels by recirculating exhaust gas suggested by e.g. Chiesa et al. (paper presented at the International Gas Turbine & Aeroengine Congress & Exhibition Stockholm, Sweeden-Jun. 2–5, 1998) in a coal based Integrated Gasification and Combined Cycle (IGCC) plant or described by Ronning et al. in Norwegian patent 180520.

CO$_2$ can be removed from exhaust gas by means of several separation processes, e.g. chemically active absorption processes, physical absorption processes, adsorption by molecular sieves, membrane separation, and cryogenic techniques. Chemical absorp-tion by means of alkanolamines is presently considered the most practical and economical method to separate CO$_2$ from exhaust gas at near atmospheric pressure. In fact MEA (monoethanolamine) is the absorption medium that dominates due to its high affinity for CO$_2$ even at low partial pressure of CO$_2$.

The application of MEA for absorbing CO$_2$ from exhaust gas has been described in the literature by Pauley et al. (Proceedings of the Gas Conditioning Conference, Norman, Ok, Mar. 5–7, 1984, paper H; an abbreviated version in Oil & Gas J., May 14, 1984, p 87–92). They describe a CO$_2$ removal system based on MEA with additives. There are, however, descriptions of corrosion problems. MEA degradation, and high chemicals consumption. In the described method the exhaust gas pressure was essentially atmospheric with typically 8.5% CO$_2$ in the feedstream to the absorber. This represents a higher CO$_2$ partial pressure than will be experienced in gas turbine exhaust gas.

It is further known (see e.g. Fang-Yuan Jou et al., Can.J.Chem.Eng., 1993, vol 71, April, 264–268) that use of other amines than MEA, particularly tertiary amines like MDEA (methyidiethanolamine) is less prone to degradation, and its vapor pressure is lower than MEA's leading to lower losses of amine vapor with the gas streams leaving. The corrosion problems are also lower than if MEA is used. The use of tertiary amines, however, for treating gas turbine exhaust gas is to day uneconomical due to these amines' lower affinity for CO$_2$ compared to MEA. Hence CO$_2$ removal from exhaust gas is done by absorption in a more reactive amine like MEA. The application of MDEA requires that exhaust gas is compressed to an elevated pressure to increase the partial pressure of CO$_2$ since this increases the possible loading (mol CO$_2$/mol amine) of CO$_2$ in the MDEA solution.

These low pressure MEA-based CO$_2$ absorption processes require heavy and voluminous equipment. Furthermore, corrosion in the process equipment, degradation of the amine due to the temperature levels normally used, and generally high consumption of chemicals (e.g. amine) are major problems in these processes.

Furthermore, these processes will consume a substantial amount of heat and/or power. The application of the Selexol process, commercialised by Union Carbide, is suggested by Chiesa et al. (paper presented at the International Gas Turbine & Aeroengine Congress & Exhibition Stockholm, Sweden-Jun. 2–5, 1998) to recover CO$_2$ from a coal based Integrated Gasification and Combined Cycle (IGCC) plant. This process, however, needs a very high feed gas pressure. Chiesa et al estimated that an operating pressure of minimum 41 bar is needed to recover 90% CO$_2$ from exhaust gas when CO$_2$ in the exhaust gas was about 20%. They considered that at least 50 bar was required to obtain a reasonable driving force for mass transfer. To achieve this pressure, a partly inter cooled compressor is used. The pressurised exhaust gas is cooled to near ambient temperature by a recuperative heat exchanger, and ducted to the absorption column where CO$_2$ is captured by Selexol. The nitrogen-rich CO$_2$ depleted exhaust gas, exiting the Selexol process, is heated to about 600° C. in the gasification down stream process and is further expanded with reheating between stages. The drawback of the process scheme suggested by Chiesa et al., is the required absorption pressure of 50 bar which reduces the efficiency of the process and prevent efficient use of available process heat.

Australian patent AU 9,728,540-A relates to a process for treating a high-pressure raw gas selected from high-pressure natural gas and various synthesis gases with a carbon dioxide absorbing fluid, whereby highly concentrated carbon dioxide is almost fully removed from the raw gas to obtain a refined gas having a carbon dioxide concentration of 10 to 10000 ppm, and moreover for recovering carbon dioxide partially at high-pressure from the absorbing fluid as well as a system therefore.

The Australian patent teaches partial desorption of CO$_2$ at elevated pressure which is defined in that patent as at least 2 kp/cm 2 abs (approximately 2 bar). The referred patent further limits the desorption pressure in its first separator to the pressure of the absorber which in most cases makes it impossible to condense recovered CO$_2$ by cooling water which is an advantage if CO$_2$ shall be compressed to the required pressure for deposition in a geological formation. Typically this would require 50 bar or above. The Australian patent defines any pressure above 2 bar as high pressure. Carryover of the active part (typically an alkanolamine) of the aqueous solution may take place from the first gas-liquid separator in the described process, and this may also be a problem in conventional absorption/desorption systems. The Australian patent specifies 90° C. to 150° C. as the temperature level at which CO$_2$ is partially desorbed at elevated pressure in their first desorption stage. Energy to preheat the absorbent must be available at a few degrees higher, typically 10 degrees or more. The temperature level needed in their reboiler (12) in their FIG. 1 is dictated by the boiling point of the CO$_2$-free absorbent plus an increase to provide driving force.

The main object of the present invention was to arrive at an improved method for removing and recovering $CO_2$ from exhaust gas from a power and/or heat generating process by chemical absorption and desorption in a way that implies reduced weight and volume of the equipment used in the absorption and desorption process.

Another object of the present invention was to arrive at an improved method for removing and recovering $CO_2$ from exhaust gas from a power and/or heat generating process by chemical absorption and desorption in a way that implies more efficient use of other amines than MEA compared to previously known $CO_2$ absorption and desorption methods.

A further object of the invention was to arrive at an improved method for removing and recovering $CO_2$ from exhaust gas from a power and/or heat generating process by chemical absorption and desorption which has low consumption of chemicals and insignificant corrosion and degradation problems compared to previously known methods.

Furthermore, yet another object of the present invention was to arrive at an improved method for removing and recovering $CO_2$ from exhaust gas from a power and/or heat generating process by chemical absorption and desorption which reduces the power needed to compress the recovered $CO_2$ stream to deposition pressure.

In view of the above mentioned problems associated with removing and recovering $CO_2$ from exhaust gas from a power and/or heat generating process by chemical absorption and desorption, research has been made.

The inventors found that the problems mentioned above can be solved if the exhaust gas stream from a power and/or heat generating process is recompressed to between 5 and 30 bar and more preferably between 7 and 20 bar before entering the $CO_2$ absorption unit, and that this recompression implies that an improved absorption and desorption process is achieved which eliminates the problems mentioned above connected to previously known techniques.

The inventors found a method for removing and recovering $CO_2$ from exhaust gas from a power and/or heat generating plant (a main power plant) by chemical absorption and desorption respectively, where the exhaust gas is fed to an absorber containing a chemical absorbent where the $CO_2$ is absorbed in said absorbent and a $CO_2$-depleted exhaust gas stream is formed, and the $CO_2$ rich absorbent is further fed to a desorber where $CO_2$ is removed from the absorbent, and the absorbent essentially free of $C0_2$ is recirculated to the absorber and the desorbed $CO_2$ gas is discharged off, where the exhaust gas is cooled and recompressed to an elevated pressure, in a compressor in a secondary power plant integrated with the main power plant, said absorber and said desorber, before entering the absorber, and that the $CO_2$-depleted exhaust gas emerging from the absorber is reheated and further expanded in an expander in said secondary power plant.

Recompression of exhaust gas will consume a substantial amount of power. The power consumption will, however, be reduced substantially if a gas turbine or an inter-cooled compressor and expander system, i.e. a Brayton cycle, hereinafter called the secondary power system, is integrated with the power and/or heat generating plant, hereinafter called the main power system, and the $CO_2$ absorption unit which may then be in an improved absorption and desorption process. The Brayton cycle. which is a compression and expansion process, is the basis of all gas turbine cycles.

According to the present invention, exhaust gas from the main power system is cooled and compressed (optionally with intercooling between the stages) in the secondary power system. The compressed exhaust gas containing $CO_2$ is cooled and is fed to an absorber unit in the $CO_2$ absorption and desorption system according to the present invention. The $CO_2$-depleted exhaust gas emerging from the absorber unit is in the secondary power system re-heated and expanded to near atmospheric pressure thus generating power to compress the $CO_2$ containing exhaust gas entering the absorber unit. The number of intercooled compressor stages, the recompression pressure, and the reheating temperature is selected in such a way that the expansion turbine at least generate enough power to drive the compressor.

In the above mentioned absorber unit the exhaust gas is first fed to an absorption column where it is contacted with an absorbent that picks up most of the $CO_2$. The $CO_2$ rich absorbent from the absorption unit is pumped as required to desorption pressure which may be higher than the absorption pressure. The temperature in the rich absorbent is raised to the level needed to render $CO_2$ on desorption at a pressure facilitating condensation by cooling water, typically this would require 50 bar or above.

After increasing/raising the temperature in the rich absorbent stream, the stream is fed to a first gas-liquid separator before entering the desorption unit.

To avoid undue carryover of the active part (typically an alkanolamine) in the absorbent, the first gas-liquid separator has a dephlegmator (i.e. condensator with reflux) installed in the gas stream. In this dephlegmator a condensed liquid phase separation will take place leaving mostly water in the $CO_2$ since the active part is less volatile than water. The condensed phase will flow back into the separator.

A similar arrangement is made over the top of the desorption column. The energy taken out in the dephlegmators is foreseen recovered.

Further, the desorber is equipped with a side reboiler at a place where there is still $CO_2$ in the absorbent and the temperature is thus lower than it would be if dictated by the vapour pressure of the absorbent solution alone. This lower temperature facilitates use of energy at a lower temperature than if a bottom reboiler is used where very little $CO_2$ is present. The last reboil effect is provided by live steam.

The use of the dephlegmators allows the use of higher temperature in the desorption units than in conventional desorption units without losing more active absorbent. The dephlegmators also provides water outlets which give more freedom to use live steam than in a conventional absorption-desorption system. Live steam enables use of lower temperature steam than would be required if the temperature difference in a heat exchanger had to be overcome.

The pressure of the recovered $CO_2$ is attained by use of thermal energy through desorption of $CO_2$ at a higher pressure created by applying a higher temperature in the desorber than conventionally used. The enabling factor is the operation of the absorption column at pressure which follows from exhaust gas recompression. In spite of the energy recovery from the pressurised, $CO_2$-depleted exhaust gas, this represents a finite energy consumption which implies efficiency loss for the overall energy conversion process. Hence, the exhaust gas recompression and thus the absorption column pressure should be kept to a minimum.

Selecting the right combination of recompression pressure and reheating temperature is a very important factor in order to achieve an efficient process according to the present invention. Increased reheating temperature combined with a slightly increased cycle pressure ratio will increase process efficiency. This applies to all gas turbine cycles according to the principle of the Brayton cycle. Reheating can be accomplished by using available heat in the hot exhaust gas generated in the main power system. The reheating temperature in this case is limited to the hot exhaust gas temperature which normally is below 500–700° C. Additional firing in the main power system to heat the compressed, $CO_2$-depleted exhaust gas in the secondary power system will increase the fuel to power efficiency further, because this will both increase the concentration of $CO_2$ in the exhaust gas and allow a higher reheating temperature. The trade-off between the two reheating cases is higher investment cost but improved efficiency in the additional firing case versus less expensive equipment but lower efficiency in the hot exhaust gas reheating case. In both cases heat supplied to the compressed $CO_2$-depleted exhaust gas can be recovered as power at high efficiency in a turbine by depressurising the gas.

By this method the overall process efficiency may be in the same order as if $CO_2$ is removed and recovered at atmospheric pressure, but the high absorption pressure will reduce the size of the $CO_2$ removal and recovery system substantially since the gas volume becomes smaller when the gas is compressed, and the driving force for the absorption becomes larger. There is accordingly a reduction in both tower diameter and height in the absorption column. The volume and weight of the desorption column may also be reduced if the higher partial pressure of $CO_2$ in the gas leaving the absorption column is exploited to leave more $CO_2$ in the regenerated (lean) absorbent. Alternatively, this could be exploited to increase the $CO_2$ recovery.

The high pressure also makes it technically and economically feasible to select other alkanolamines than MEA. Other alkanolamines may then be found which are more energy efficient, less corrosive and less prone to degeneration, e.g. MDEA. Elevated pressure in the absorber enables the use of tertiary amines for absorbing the $CO_2$, and this eliminates the corrosion and degradation problems associated with the use of MEA as the chemically active part of the absorbent.

Recovery of $CO_2$ at elevated pressure will also reduce the work required to compress $CO_2$ before injection and deposition.

Recirculation of exhaust gas in the main power system will improve the electric power efficiency further.

The high partial pressure of $CO_2$ at the absorption tower bottom also allows a higher loading of $CO_2$ on the alkanolamine which reduces the absorbent circulation rate required to effect $CO_2$-removal.

The method according to the invention provides separation of absorbent and water in the desorber section overhead streams thus providing extra freedom to allow live steam to be used in the stripping column. Using live steam for the highest temperature heat effect means its temperature level may be reduced by the driving force otherwise used for indirect heat. This feature, and the use of a side reboiler, allows the use of a heating medium at lower temperature than normally employed by such processes.

The invention will be further explained and envisaged in the examples corresponding to the figures.

Figure 1:
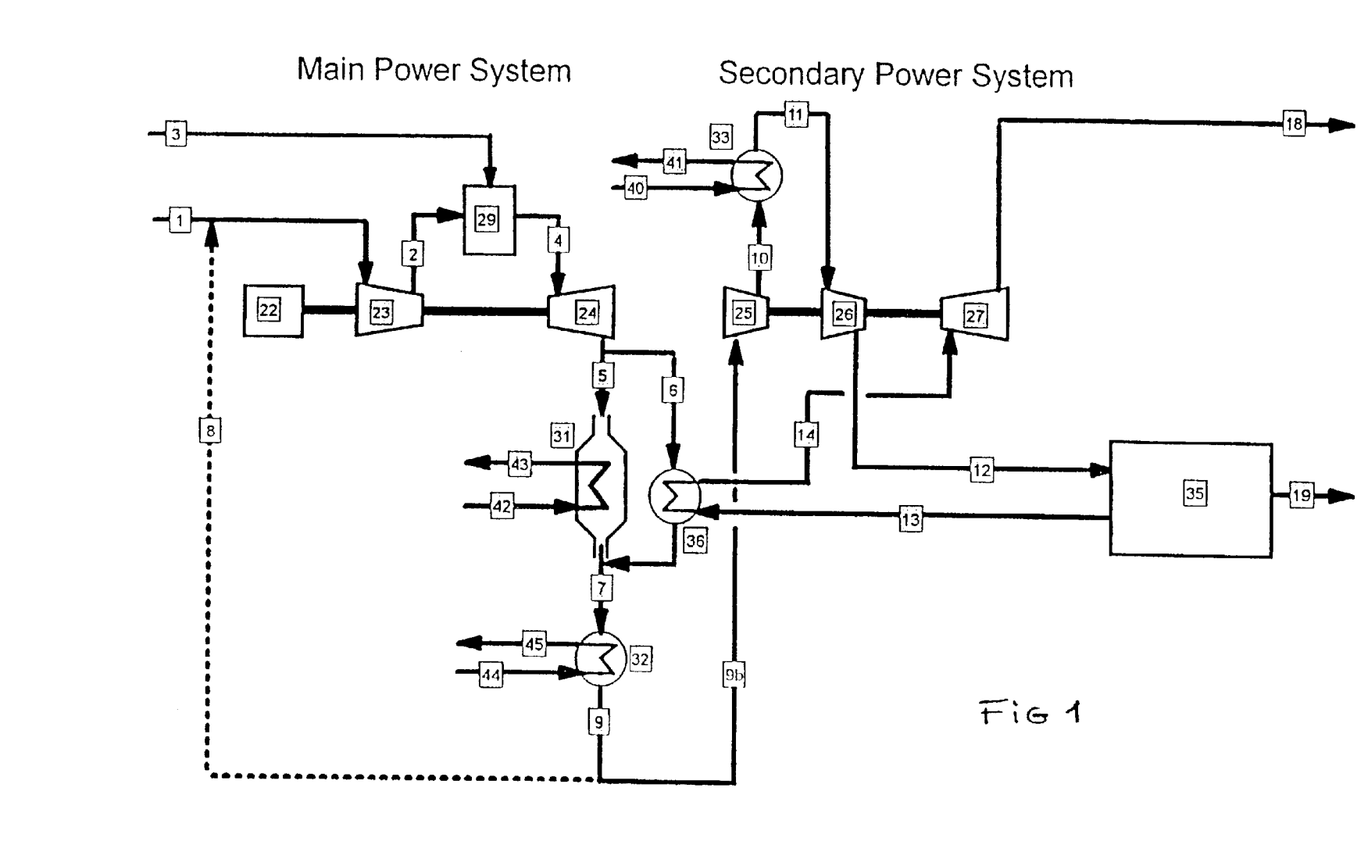
FIGS. 1 and 1a show a power and heat generating plant integrated with a Brayton cycle and a $CO_2$ absorption-desorption system according to the present invention.
Figure 1A:
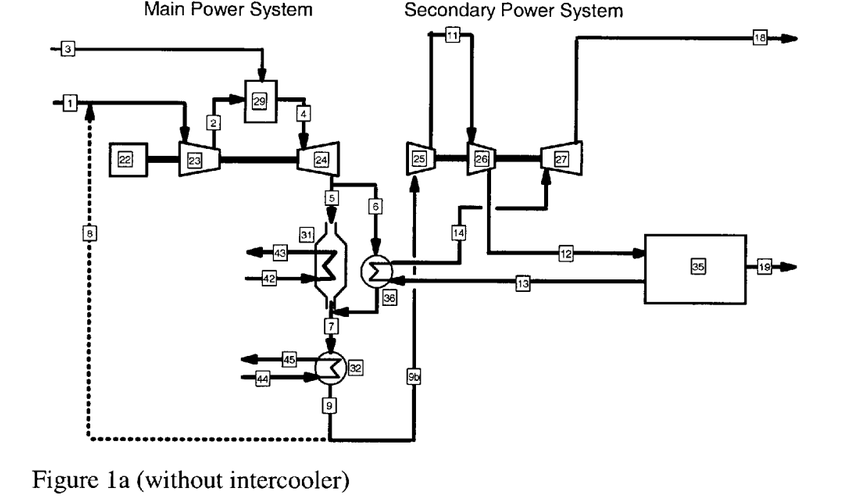

FIG. 1: Air 1 is fed to gas turbine compressor 23 where air is compressed. Air 2 at elevated temperature and pressure is fed to the combustion chamber 29 where it is used to combust a carbon containing fuel 3. The hot combusted gas stream 4 is depressurised in gas turbine expander 24 to near atmospheric pressure and electric power is generated in the electric power generator 22. (Alternatively the power may be used directly on a machine drive). Heat is recovered partly by generating steam (43) in boiler 31 (optionally) and partly by heat exchanging with $CO_2$ depleted exhaust gas 13 in heat exchanger 36. The entire exhaust gas stream 7 is further cooled with cooling water (44) in heat exchanger 32 to below 50° C. Cooled exhaust gas 9 is further fed to a compressor (25) (stage 1) and 26 (stage 2) with cooling by means of a cooling medium (40) between the stages. One or three intercooled stages may be used. Stream 12 may be cooled to below 50° C. in a water cooled heat exchanger (not shown).

$CO_2$ in the exhaust gas is removed in unit 35 from where a $CO_2$-stream 19 is purged from the system. The $CO_2$-depleted exhaust gas stream 13 is reheated in recuperator 36 and is depressurised in the expander 27 to near atmospheric pressure. The $CO_2$-depleted exhaust gas 18 from the expander 27 is discharged to the atmosphere. The temperature in stream 14 is regulated such that the power generated in expander 27 is sufficient for compression of exhaust gas 9.

In order to reduce the volume of exhaust gas to be handled in the $CO_2$ absorption and desorption unit and to increase the concentration of $CO_2$ and thus reduce the cost of the $CO_2$ units, some of the exhaust gas in the main gas turbine cycle may be recycled as stream 8. This recycle of exhaust gas is regulated in such a way that the concentration of oxygen in stream 2 is at least sufficient for maintaining a flame in combuster 29. An alternative configuration of the process according to the invention comprises a process according to FIG. 1 and where $CO_2$ depleted exhaust gas stream 14 is further heated by means of a gas turbine combuster by addition of a fuel. This will increase fuel efficiency, but application of a carbon containing fuel will reduce the degree of $CO_2$ recovery. Hydrogen will be the preferred fuel in this case. Excess power could be recovered as electric power by means of an electric power generator. Heat content in exhaust gas 18 may be recovered by for instance generation of steam.

A further alternative configuration of the process comprises a process according to FIG. 1 and where $CO_2$ depleted exhaust gas stream 13 is heated by means of a gas turbine combuster by addition of a fuel. In this case heat exchanger 36 is omitted. In the secondary gas turbine cycle a high temperature (>1000° C.) inlet the gas turbine expander is achieved assuming at least 10% oxygen left in the $CO_2$-depleted exhaust gas stream 13. This will secure an efficient secondary gas turbine cycle. The disadvantage of this alternative process configuration is reduced degree of $CO_2$-removal if a carbon containing fuel is used. Preferably hydrogen should be used in the second gas turbine cycle to obtain a high degree of $CO_2$-removal. Solar made hydrogen may be used or hydrogen made from fossil fuels where $CO_2$ is removed and deposited.

Figure 2:
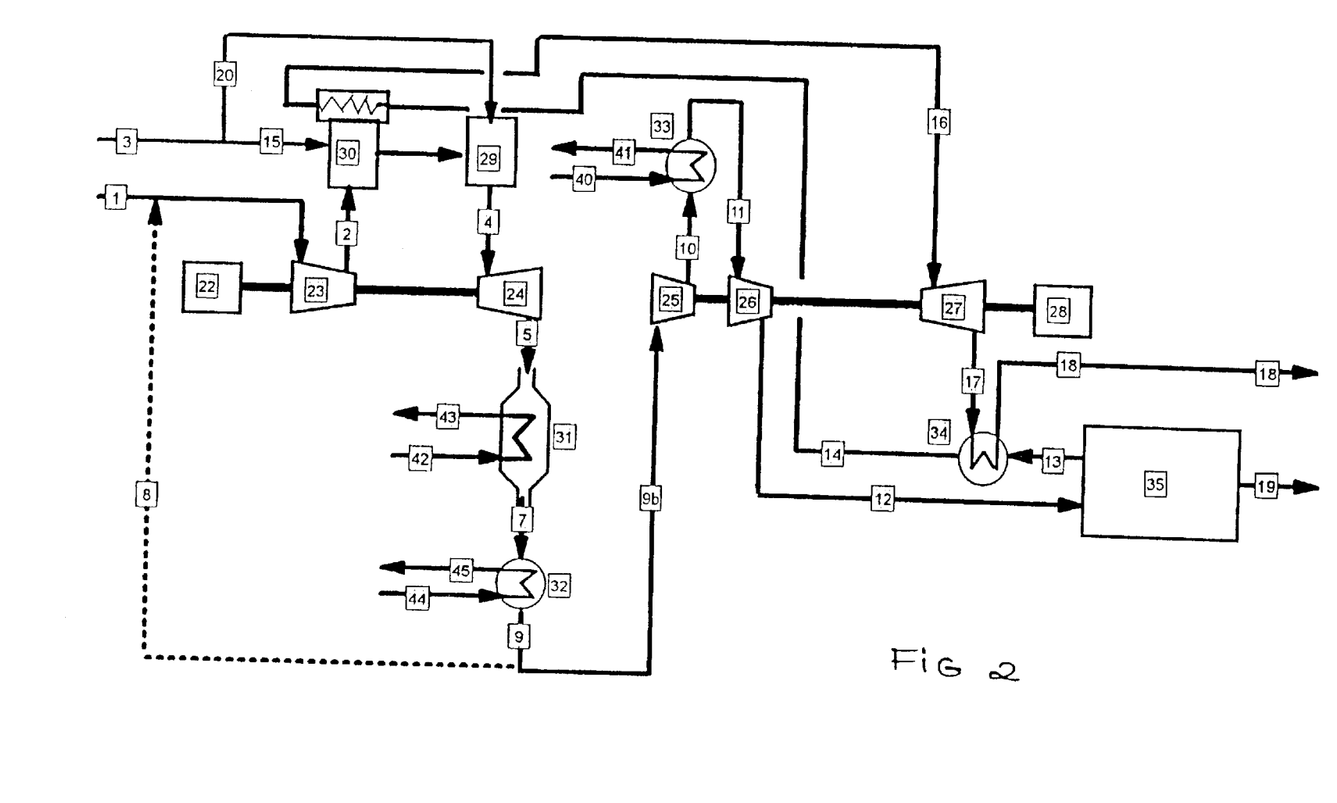
FIGS. 2 and 2a show a power and heat generating plant integrated with a Brayton cycle and a $CO_2$ absorption-desorption system according to the present invention and where a fired heater is integrated with the main power and/or heat generating plant.
Figure 2A:
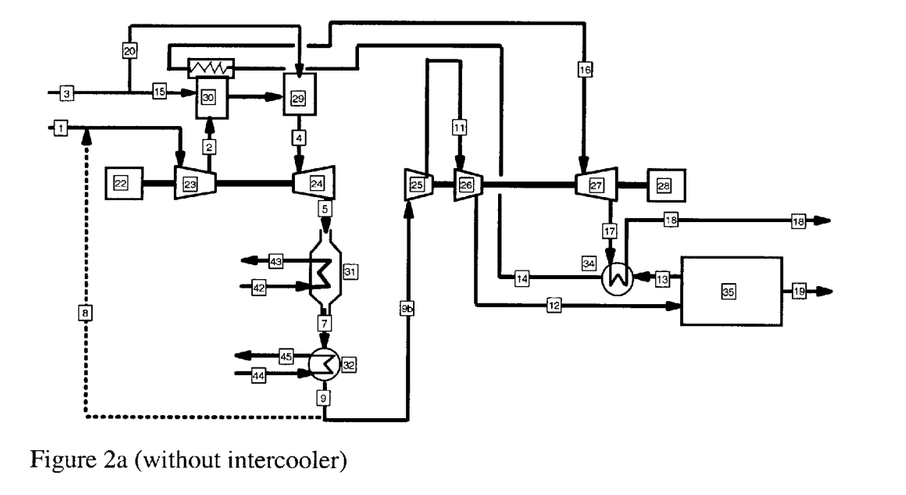

FIG. 2: Air 1 is fed to gas turbine compressor 23 where air is compressed. Air 2 at elevated temperature and pressure is fed to a fired heater (30) where it is used to combust fuel stream 15. Heat is transferred to stream 16. The combusted gas mixture is further heated in combuster 29 by burning a fuel 20. The hot gas mixture is depressurised in gas turbine expander 24 to near atmospheric pressure and electric power is generated in the electric power generator 22. (Alternatively the power may be used directly on a machine drive). Heat is recovered by generating steam (43) in boiler 31. The exhaust gas stream 7 is further cooled by cooling water in heat exchanger 32 to below 50° C. Cooled exhaust gas 9 is further fed to compressor 25 (stage 1) and 26 (stage 2) with cooling by means of a cooling medium (40) between the stages, however, one or three intercooled stages may be used. $CO_2$ in the exhaust gas is removed in unit 35 from where a $CO_2$-stream 19 is purged from the system. The $CO_2$-depleted exhaust gas stream 13 is reheated in recuperator 34 and is further heated in the pressurised fired heater 30. Stream 16 is depressurised in the expander 27 to near atmospheric pressure and heat is recovered in recuperator 34. The $CO_2$-depleted exhaust gas 18 is discharged to the atmosphere. In order to reduce the volume of exhaust gas to be handled in the $CO_2$-removal unit some of the exhaust gas in the main gas turbine cycle may be recycled as stream 8. This recycle of exhaust gas is regulated in such a way that the concentration of oxygen in stream 2 is at least sufficient for maintaining a flame in combuster 29.

An alternative configuration of the power generation process comprises a process according to FIG. 2 where $CO_2$ in the exhaust gas is removed at both high pressure and high temperature. This process configuration has an advantage if a $CO_2$-removal process is developed that can remove $CO_2$ at high temperature (250–550° C.). In this case the recompression of the $CO_2$-depleted exhaust gas can be done without cooling between compressor stages which could increase overall process efficiency.

The advantage of this process is that it will increase the concentration of $CO_2$ in the exhaust gas and allow for increased temperature inlet the second gas turbine expander compared with the process according to FIG. 1 giving reduced amount of gas to be handled in the $CO_2$-removal process and increased total process efficiency. All fuel is added to the main gas turbine cycle giving a high degree of $CO_2$-removal.

Figure 3:
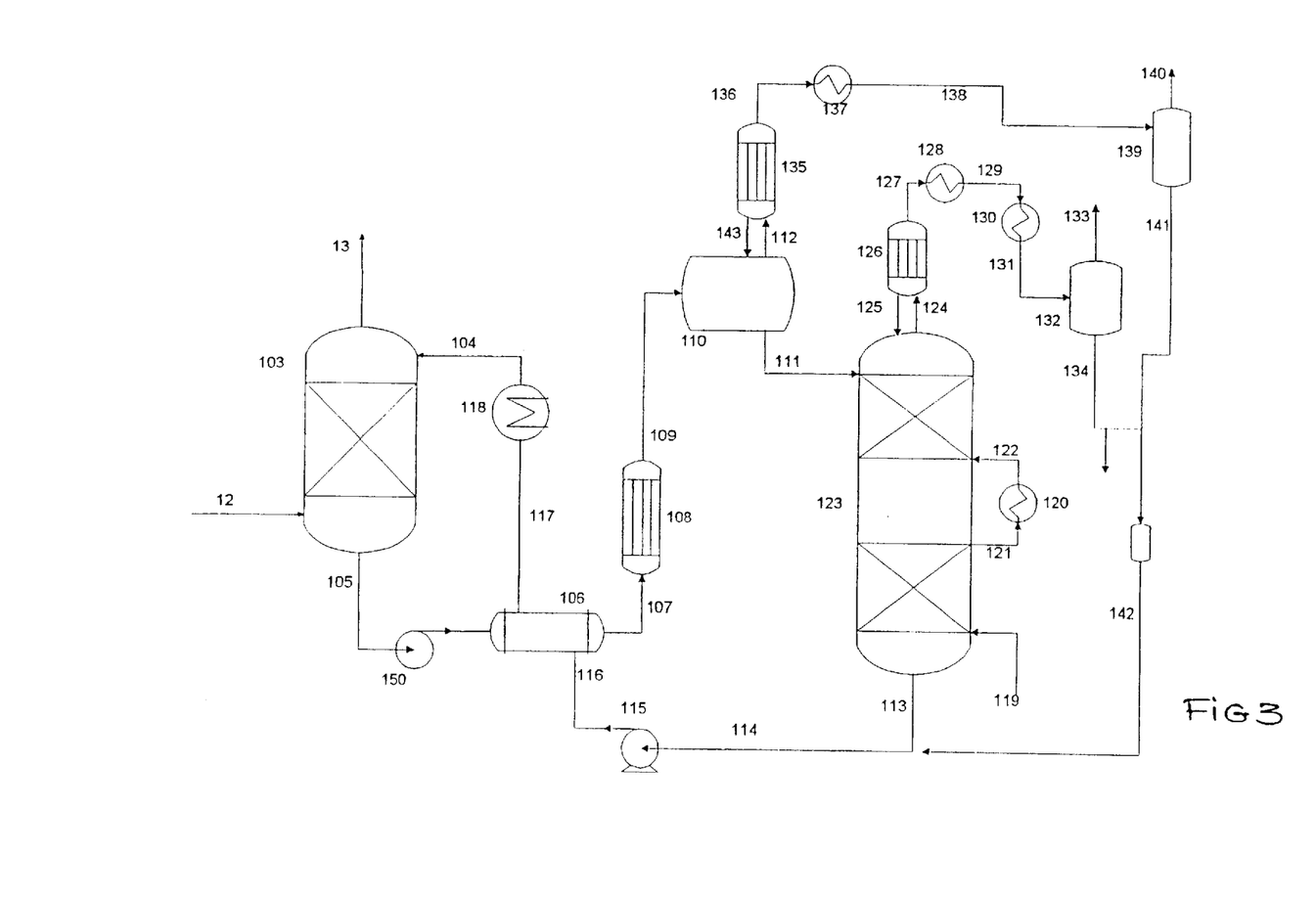
FIG. 3 shows absorption-desorption plant featuring items to facilitate a more energy economic way of removing and recovering $CO_2$ from an exhaust gas by carrying out desorption at elevated pressure thus rendering the recovered $CO_2$ at pressure.

FIG. 3: Exhaust gas rich in $CO_2$ (12) is fed to an absorption column (absorber) 103 that renders a $CO_2$ depleted stream 13. A lean $CO_2$ solution 104 is fed to the top of column 103 and the solution picks up $CO_2$ thus leaving as a $CO_2$-rich solution 105. The stream 105 is heated in the economiser (heat exchanger) 106 giving a warmed up stream 107 that is further heated in the heater 108 (that is assumed heat integrated with the energy and $CO_2$ producing process). The heating results in some of the $CO_2$ being converted to a gas phase rendering stream 109 as two-phase. The stream 109 is then fed to the flash gas-liquid separator 110 where the gas phase leaves overhead 112, and the liquid phase 111 that still contains $CO_2$ attached to the absorbent is fed to the desorption column (or stripper) 123. If the stripper 123 is operated at a lower pressure than the flash separator 110, then the gas phase part ensuing from the stream 111 flashes off to leave with the overhead stream 124. The liquid phase of stream 111 flows down the stripper 123 countercurrent to steam rising. This steam is the result of the reboiler 120 and/or the live steam 119 introduced at the bottom. The use of the side reboiler 120 enables use of a lower quality energy (energy at a lower temperature) than if the reboil was to be performed at the very bottom of the stripper 123. With a side reboiler 120, the steam 119 is necessary to provide an upward vapour flow in the bottom section. (Optionally this could be provided by a second reboiler). The regenerated solution, lean in $CO_2$, 113 is routed to the economiser 106 where it is cooled before it as stream 117 is finally cooled to the temperature desired for entering the absorption column 103 anew. The vapour stream 124 from the stripper 123 goes to an overhead dephlegmator 126 that condense the absorbent under reflux conditions to recover same. The recovered absorbent is returned 125 to the stripper 123. The overhead stream 127 may still contain valuable heat (in the form of hot gas and water vapour) and this heat which may be recovered in the economiser 128, e.g. as steam, before the stream 129 is taken to condenser 130 to recover absorbent and water condensate 134 that is returned to the absorbent loop via stream 134 while the $CO_2$ recovered leaves as stream 133 from the separator 132. The gas phase leaving 112 leaving the flash gas-liquid separator 110 is also shown taken to a dephlegmator 135 for absorbent recovery before the gas stream 136 is cooled 137 followed by condensate recovery 139 from where the $CO_2$ leaves overhead 140 while the condensate 141 is recycled to the absorbent loop.

EXAMPLE 1

The power generation process as described in FIG. 1 is envisaged in the following example.

Air 1 at ambient conditions is fed to gas turbine compressor 23 where air is compressed to 20 bar. Compressed air 2 at 465° C. and 20 bar is fed to the combustion chamber 29 where it is used to combust a carbon containing fuel 3. Some of the air is used for cooling purposes. Hot combusted gas stream 4 at about 1250° C. is depressurised in gas turbine expander 24 to near atmospheric pressure at about 590° C. Electric power is generated in the electric power generator 22. (Alternatively the power may be used directly on a machine drive). Heat is recovered partly by generating steam (43) in boiler 31 (optionally) and partly by heat exchanging with $CO_2$ depleted exhaust gas 13 in heat exchanger 36. The entire exhaust gas stream 7 at about 170° C. is further cooled with cooling water (44) in heat exchanger 32 to about 40° C. Alternatively some of the heat may be used for heating purposes i.e. in the $CO_2$ removal plant. Cooled exhaust gas 9 is further fed to compressor 25 (stage 1) and 26 (stage 2) with cooling by means of a cooling medium (40) between the stages. Stream 12 at about 10 bar is further cooled to below 35° C. in a water cooled heat exchanger (not shown).

More than 80% of $CO_2$ in the exhaust gas is removed in unit 35 from where a $CO_2$-stream 19 is purged from the system and may be further compressed and injected in an aquifer for long term deposition or may be used for enhanced oil and gas recovery. The $CO_2$-depleted exhaust gas stream 13 is reheated in recuperator 36 to about 450° C. and is depressurised in the expander 27 to near atmospheric pressure. The $CO_2$-depleted exhaust gas 18 from the expander 27 is discharged to the atmosphere. The temperature in stream 14 is regulated such that the power generated in expander 27 is sufficient for compression of exhaust gas 9.

In order to reduce the volume of exhaust gas to be handled in the $CO_2$ removal and recovery system some of the exhaust gas in the main gas turbine cycle may be recycled as stream 8. This recycle of exhaust gas is regulated in such a way that the concentration of oxygen in stream 2 is at least sufficient for maintaining a flame in combuster 29. This recirculation will also increase the fuel to electric power efficiency as shown in table 1.

TABLE 1

The fuel to electric power efficiency exclusive $CO_2$-removal for a power and heat generating process according to FIG. 1 and the partial pressure of $CO_2$ in the inlet to the $CO_2$ removal and recovery plant against the recycle ratio (stream 8/stream 9) of exhaust gas in the main power system. (A steam cycle is included in the estimate by calculating the potential steam production and assuming 28% efficiency for conversion from thermal to mechanical energy (hereinafter called a simple steam cycle))

| Recycle ratio Stream 8/ Stream 9 | Fuel to power efficiency, % | $CO_2$ part. pressure, bar (Inlet $CO_2$-absorp.) |
|---|---|---|
| 0 | 44.6 | 0.38 |
| 0.1 | 45.3 | 0.42 |
| 0.2 | 45.9 | 0.48 |
| 0.3 | 46.6 | 0.55 |
| 0.4 | 47.2 | 0.65 |
| 0.5 | 47.9 | 0.79 |
| 0.6 | 48.5 | 1.01 |

Table 1 shows that recycle of exhaust gas improves efficiency. This is because recycle of exhaust gas increases the concentration of $CO_2$ in said exhaust gas and thus reduces the amount of gas which has to be treated in the integrated secondary power system and $CO_2$-removal and recovery system. According to FIG. 4 which shows the heat consumption in the $CO_2$-removal plant against the inlet partial pressure of $CO_2$, the heat requirement will be reduced if the partial pressure of $CO_2$ is increased.

Figure 4:
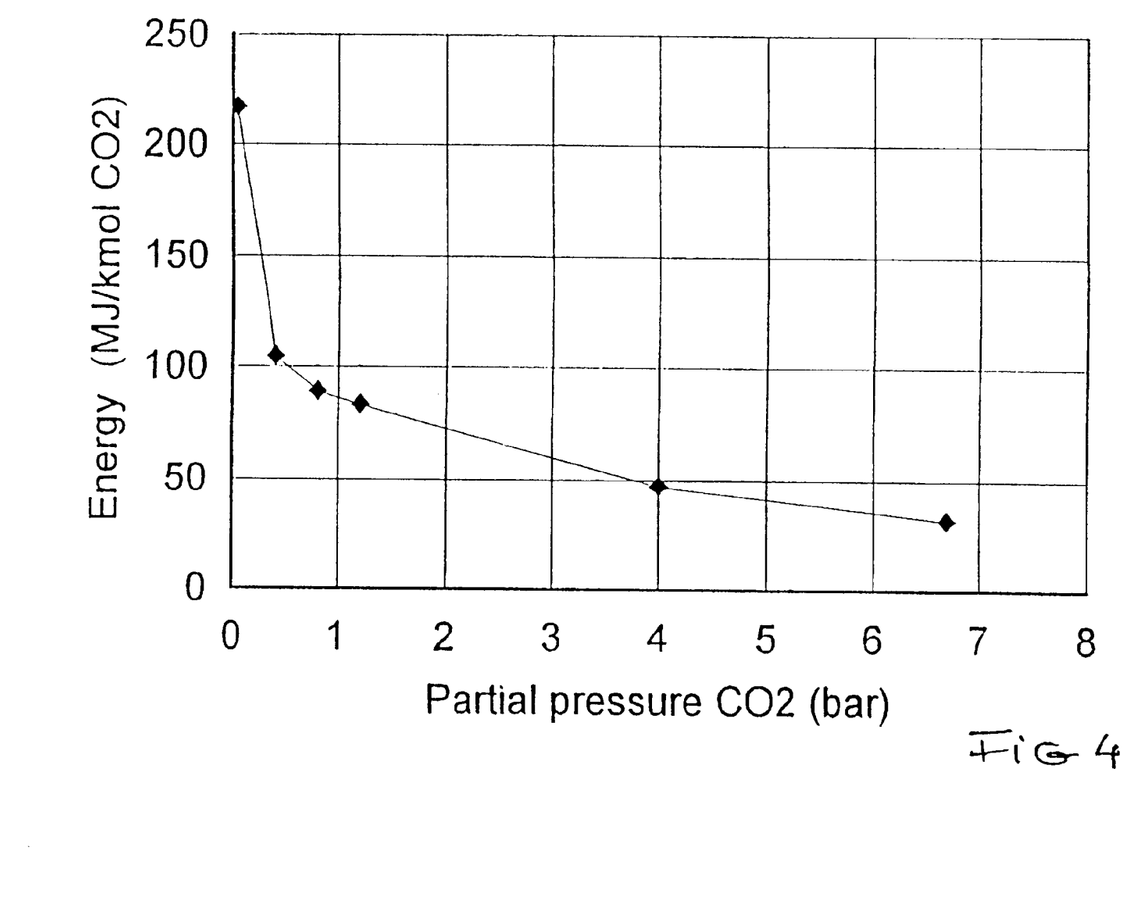
FIG. 4 shows heat consumption in the absorption and desorption unit as function of the partial pressure of $CO_2$ in the inlet to the absorption column.

$CO_2$-removal by means of absorption by MEA at atmospheric pressure and assuming 50% recycle of exhaust gas will reduce efficiency with about 5–6% points according to FIG. 4. $CO_2$-removal by means of absorption at 10 bara will reduce efficiency by 3 to 4% points. Estimates have been done for a given conventional gas turbine based power system with a simple steam cycle and with 50% recycle of exhaust gas giving a fuel to electric power efficiency of 51% exclusive of $CO_2$-removal and 45–46% inclusive of $CO_2$-removal.

As for comparison the fuel to electric power efficiency with recompression of exhaust gas to 10 bar according to FIG. 1 will be about 44–45% inclusive $CO_2$-removal and assuming 50% recycle of exhaust gas.

This example shows that the power and heat consumption for $CO_2$-removal at elevated pressure is close to the power and heat consumption if $CO_2$ is removed in a process at atmospheric pressure. The advantage is substantially reduced size of the CO2-removal and recovery system. In an absorption/desorption system, other amines than MEA, less prone to degradation, with lower amine losses, and reduced corrosion problems, can be used.

EXAMPLE 2

The power generation process as described in FIG. 2 is envisaged in the following example.

Air 1 at ambient conditions is fed to gas turbine compressor 23 where air is compressed to about 20 bar. Air 2 at 465° C. and 20 bar is fed to a fired heater 29 where it is used to combust fuel stream 15. One part of the air is used for cooling purposes (not shown). Heat is transferred to stream 16. The combusted gas mixture is further heated in combuster 29 by burning a fuel 20. The hot gas mixture at about 1250° C. is depressurised in gas turbine expander 24 to near atmospheric pressure and electric power is generated in the electric power generator 22. (Alternatively the power may be used directly on a machine drive). Heat is recovered by generating steam (43) in boiler 31. The exhaust gas stream 7 at about 100 to 170° C. is further cooled by cooling water in heat exchanger 32 to below 50° C. Cooled exhaust gas 9 is further fed to compressor 25 (stage 1) and 26 (stage 2) with cooling by means of a cooling medium (40) between the stages. Stream 12 at about 10 bar is further cooled to below 35° C. in a water-cooled heat exchanger (not shown).

More than 80% of $CO_2$ in the exhaust gas is removed in unit 35 from where a $CO_2$-stream 19 is purged from the system and may be further compressed an injected in an aquifer for long term deposition or may be used for enhanced oil and gas recovery.

$CO_2$ depleted exhaust gas stream 13 is re-heated in recuperator 34 and is further heated in the pressurised fired heater 30 to about 850° C. or higher dependant on the pressure. Stream 16 is depressurised in the expander 27 to near atmospheric pressure and heat is recovered in recuperator 34. The $CO_2$ depleted exhaust gas 18 is discharged to the atmosphere.

The concentration of $CO_2$ in stream 12 may be increased by increasing the temperature in stream 16 as shown in table 2.

TABLE 2

The fuel to electric power efficiency exclusive $CO_2$-removal for a heat and power generating process according to FIG. 2 and the partial pressure of $CO_2$ inlet the $CO_2$ removal plant against the temperature inlet expander 27 at an exhaust gas recycle ratio (EGRR) of 0.5 (stream 8/stream 9).

| Temp. (° C.) inlet expander | Efficiency, % | $CO_2$ part. press., bar |
|---|---|---|
| (FIG. 2) 755 | 49.4 | 0.89 |
| (FIG. 2) 885 | 49.9 | 0.95 |
| (FIG. 1) 450 | 47.9 | 0.79 |

This example shows that integration of a fired heater in the main power system to heat $CO_2$-depleted recompressed exhaust gas could increase the efficiency compared to example 1. Table 2 also shows the effect of increasing the pre-heating temperature on the process efficiency.

If $CO_2$-removal by the improved absorption/desorption method is included the total fuel to power efficiency will be about 46–47% assuming a simple steam cycle. The conventional method with $CO_2$-removal at close to atmospheric pressure could give a fuel to electric power efficiency of 45–46% if estimated on the same bases (fuel composition, compressor and turbine efficiencies, flue gas temperatures etc.)

EXAMPLE 3

The absorption-desorption process depicted in FIG. 3 is envisaged in the following example.

The feed gas 12 to absorption column 103 in the $CO_2$-removal- and recovery system 35, is at 10 bar and 40° C. with a $CO_2$ content of 8%. The $CO_2$ removal efficiency of the absorption column 103 is 80%. Operating with an equilibrium approach of approximately 80% at the bottom end of the column, using an absorbent circulation rate of 36.4 m3/h and an absorbent consisting of a 4.3 molar aqueous solution of MDEA, the $CO_2$ loading in the solution is 0.51 mol $CO_2$ pr. mol MDEA.

Recovering heat from the lean solution 116 in heat exchanger 106 the rich solution is further heated in the exchanger 108 to 140° C. The $CO_2$ back pressure from the solution is then approximately 48 bar. When this solution is flashed into the vessel 110 at 10 bar, the $CO_2$ loading in the solution is reduced to 0.27 mol $CO_2$ pr. mol MDEA which is the $CO_2$ loading in stream 111. The vapour fraction passes overhead as stream 112 to the dephlegmator 135 where the stream is cooled and partially condensed. The condensate flows back down 135 while acting as reflux. The cooling is arranged such that there is no significant loss of MDEA in stream 136 while its water content is near that dictated by the equilibrium conditions at the top of 135. This water is virtually all condensed in the condenser 137. The desorption column 123 operates at approximately 5 bar, and it has a side reboiler 120 powered by 5 bar steam. The solution trickling down the column 123 is thus heated to 140° C. rendering only a small amount of $CO_2$ left in the solution. This rest is further lowered to 0.05 mol $CO_2$ pr. mol MDEA in the bottom section of column 123 by use of direct steam injection. The overhead vapour stream 124 from the desorption column goes to the dephlegmator 126 which operates analogously to the dephlegmator 135.

This technique eliminates in whole or in part the need to compress $CO_2$ to deposition or consumption pressure. The desorption at elevated pressure may be performed with no further items than those indicated, at least within the detail shown.

By the present invention the inventors have arrived at an improved method for removing and recovering $CO_2$ from exhaust gas which reduces weight and volume of the equipment used in the absorption and desorption process and allows efficient use of other amines than MEA.

Efficiency loss due to recompression is eliminated by limiting the recompression pressure to below 30 bar and preferably below 20 bar and by selecting the right combination of recompression pressure and reheating temperature and by efficient use of energy in the $CO_2$-absorption and desorption process.

The invention reduces the temperature level of energy needed in the $CO_2$-absorption and desorption system by utilising side reboiler and/or live steam.

When using the method according to the invention, undue carryover of the active part of the absorbent is avoided due to the dephlegmators installed in the absorption and desorption system.

Furthermore, the invention enables options with respect to the selection of absorbents.

The method results in reduced amount of waste material, by-products, less corrosion problems, less chemicals consumption, and reduced weight and volume of the equipment used.

Whereas the focus in the above discussion has been on aqueous MDEA solutions, it should be obvious that other alkanolamines, including mixtures thereof, or so-called activators, may also be used with this invention. The improved method for desorption according to the present invention can be used in any process where $CO_2$ is removed from a gas.

What is claimed is:

1. A method for removing and recovering $CO_2$ from exhaust gas from a power and/or heat generating plant (a main power plant) by chemical absorption and desorption respectively, where the exhaust gas is fed to an absorber containing a chemical absorbent where the $CO_2$ is absorbed in said absorbent and a $CO_2$-depleted exhaust gas stream is formed, and the $CO_2$ rich absorbent is further fed to a desorber where $CO_2$ is removed from the absorbent, and the absorbent essentially free of $CO_2$ is recirculated to the absorber and the desorbed $CO_2$ gas is discharged off, characterised in that the exhaust gas is cooled and recompressed to an elevated pressure, in a compressor in a secondary power plant integrated with the main power plant, said absorber and said desorber, before entering the absorber, and that the $CO_2$-depleted exhaust gas emerging from the absorber is reheated and further expanded in an expander in said secondary power plant.

2. A method according to claim 1, characterised in that the secondary power plant includes a gas turbine or a compressor and an expander system in one or more stages.

3. A method according to claim 1, characterised in that the $CO_2$-depleted exhaust gas is expanded in the secondary power plant to near atmospheric pressure generating power to compress the $CO_2$ containing exhaust gas before entering the absorber.

4. A method according to claim 3, characterised in that the $CO_2$ containing exhaust gas is compressed without intercooling to between 5 and 30 bar in the secondary power plant before entering the absorber.

5. A method according to claim 3, characterised in that the $CO_2$ containing exhaust gas is compressed to between 5 and 30 bar and more preferably between 7 and 20 bar by means of an intercooled compressor in the secondary power plant before entering the absorber.

6. A method according to claim 1, characterised in that the $CO_2$ depleted exhaust gas is reheated by heat exchanging with part of the exhaust gas discharged from the gas turbine expander in the main power plant.

7. A method according to claim 1, characterised in that the $CO_2$ depleted exhaust gas is reheated by heat exchanging with part of the exhaust gas in the secondary power plant or main power plant and further in a pressurised fired heater located in the main power plant.

8. A method according to claim 1, characterised in that the $CO_2$ depleted exhaust gas is reheated by heat exchanging with the exhaust gas leaving the second power plant and further heated by means of a combuster by addition of a fuel.

9. A method according to claim 8, characterised in that the fuel is natural gas or a hydrogen containing fuel or any fuel that can be used in a gas turbine combuster.

10. A method according to claim 8, characterised in that the hot combusted gas discharged from the combuster is expanded to near atmospheric pressure.

11. A method according to claim 1, characterised in that the $CO_2$ rich absorbent is pumped to a pressure sufficiently high to allow liquefaction of $CO_2$ with cooling water, and then heated before being fed to a first gas-liquid separator where the temperature attained is sufficiently high to allow a substantial fraction of the $CO_2$ to desorb leaving a $CO_2$ depleted absorbent.

12. A method according to claim 11, characterised in that the flashed gas, consisting of $CO_2$, water, and the chemically active component, is led to a dephlegmator where it is cooled while the chemically active absorbent is preferentially condensed and made to flow back down the dephlegmator and back to the gas-liquid separator.

13. A method according to claim 12, characterised in that the temperature at the top of the dephlegmator is regulated to ensure essentially full recovery of the chemically active part of the absorbent while leaving water vapour for a next stage condensation.

14. A method according to claim 11, characterised in that the liquid fraction from the first gas-liquid separator is fed to a desorption column which may be at any pressure equal to or below the pressure in the said gas-liquid separator.

15. A method according to claim 14, characterised in that the desorption column has one or more heat sources down the column to ensure desorption of $CO_2$ and the production of water vapour to act as stripping gas.

16. A method according to claim 15, characterised in that one heat source is a side reboiler at a stage where the $CO_2$ content in the liquid allows the use of a heat source at a temperature in the range of 100–150° C.

17. A method according to claim 15, characterised in that a final heat source at the base of the desorption column is provided as live steam.

18. A method according to claim 14, characterised in that the desorption column discharges an overhead gas stream, consisting of $CO_2$, water, and the chemically active component, is led to a dephlegmator where it is cooled while the chemically active absorbent is preferentially condensed and made to flow back down the dephlegmator and back to the desorption column.

19. A method according to claim 18, characterised in that the temperature at the top of the dephlegmator is regulated to ensure essentially full recovery of the chemically active part of the absorbent while leaving water vapour for a next stage condensation.

* * * * *